United States Patent
Yadappanavar et al.

(10) Patent No.: US 7,765,120 B2
(45) Date of Patent: Jul. 27, 2010

(54) OPTIMIZATION OF CARRIER SELECTION FOR TRANSPORTATION PLANNING SYSTEM

(75) Inventors: Vinay M. Yadappanavar, San Mateo, CA (US); Rongming Sun, Hayward, CA (US); Mukundan Srinivasan, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1154 days.

(21) Appl. No.: 11/113,906

(22) Filed: Apr. 25, 2005

(65) Prior Publication Data

US 2006/0241822 A1    Oct. 26, 2006

(51) Int. Cl.
*G06F 17/50* (2006.01)
*G06Q 10/00* (2006.01)
*G06Q 30/00* (2006.01)

(52) U.S. Cl. .......................... 705/7; 705/330; 705/334

(58) Field of Classification Search .................. 705/1, 705/400, 13, 6, 8, 7, 10
See application file for complete search history.

(56) References Cited

U.S. PATENT DOCUMENTS

| | | | |
|---|---|---|---|
| 5,623,413 A | 4/1997 | Matheson et al. | |
| 5,666,493 A | 9/1997 | Wojcik et al. | |
| 5,758,329 A | 5/1998 | Wojcik et al. | |
| 5,832,453 A * | 11/1998 | O'Brien .......................... | 705/6 |
| 6,529,797 B2 | 3/2003 | Williams et al. | |
| 6,560,509 B2 | 5/2003 | Williams et al. | |
| 6,622,084 B2 * | 9/2003 | Cardno et al. ............... | 701/202 |
| 6,754,634 B1 * | 6/2004 | Ho ................. | 705/6 |
| 6,915,268 B2 * | 7/2005 | Riggs et al. ..................... | 705/7 |
| 7,127,411 B2 * | 10/2006 | Ho ................. | 705/8 |
| 7,428,021 B2 * | 9/2008 | Fukuda ........................ | 348/650 |
| 2001/0034608 A1 * | 10/2001 | Gendreau ...................... | 705/1 |
| 2002/0019759 A1 * | 2/2002 | Arunapuram et al. .......... | 705/7 |
| 2003/0046133 A1 * | 3/2003 | Morley et al. ................... | 705/8 |
| 2003/0050810 A1 * | 3/2003 | Larkin ........................... | 705/7 |
| 2003/0060924 A1 * | 3/2003 | Ye et al. ...................... | 700/217 |
| 2004/0107110 A1 * | 6/2004 | Gottlieb et al. ................ | 705/1 |
| 2004/0133458 A1 * | 7/2004 | Hanrahan ........................ | 705/8 |
| 2005/0137923 A1 * | 6/2005 | Mosbrucker .................... | 705/8 |
| 2005/0278063 A1 * | 12/2005 | Hersh et al. .................. | 700/216 |

OTHER PUBLICATIONS

Caputo et al. Industrial Management and Data Systems, 2005, V105n7, pp. 876-899.*

(Continued)

*Primary Examiner*—John W Hayes
*Assistant Examiner*—Brian Epstein
(74) *Attorney, Agent, or Firm*—Kraguljac & Kalnay, LLC

(57) ABSTRACT

Example systems, methods, computer-readable media, software, and other embodiments are described herein that relate to optimizing carrier selection for a transportation planning system. In one embodiment, given a set of trips that have been defined to transport a set of configured loads, a carrier selection logic can be provided that is configured to analyze the set of trips and attempt to repair or cure one or more constraint violations that may exist in one or more of the trips. For example, the repair may include attempting to reassign a carrier (e.g. carrier/service/vehicle type) that is assigned to a trip to a different carrier in order to reduce overall constraint violations for the set of trips and may reduce the overall global cost for the set of trips.

13 Claims, 5 Drawing Sheets

OTHER PUBLICATIONS

Oracle Corporation, Data Sheet—Oracle Transportation Planning, pp. 1-6, Sep. 2004.

Bill Schineller, Joe's Juggling Act, Lionheart Publishing, Inc., ORMS Today, pp. 1-9, Dec. 1998.

Roy Peterkofsky, Introducing Transportation Planning- "A new Solution For You" Slide Presentation, Dec. 8, 2004, pp. 1-35, Oracle Open World.

* cited by examiner

OPTIMIZATION OF CARRIER SELECTION FOR TRANSPORTATION PLANNING SYSTEM

CROSS REFERENCE TO RELATED APPLICATIONS

This application is related to the following U.S. patent applications, which are all assigned to the present assignee, and which are incorporated herein by reference in their entirety:

"Transportation Planning With System Assisted Exception Resolution", Ser. No. 11/093,830 filed Mar. 30, 2005, inventors: Goossens et al., "Transportation Planning With Multi-Level Firming", Ser. No. 11/078,675 filed Mar. 11, 2005, inventors: Peterkofsky et al., "Transportation Planning With Parallel Optimization", Ser. No. 11/097,435 filed Apr. 1, 2005, inventors Sun et al., "Transportation Planning With Multi-Level Pooling Model", Ser. No. 11/113,514, filed Apr. 25, 2005, inventors Sun et al., and "Transportation Planning With Drop Trailer Arrangements", Ser. No. 11/067,154, filed Feb. 25, 2005, inventors Peterkofsky et al.,.

BACKGROUND

A Transportation Planning Problem involves determining a cost-optimal way of transporting a set of orders from a set of origins to a set of destinations based on a variety of factors. The factors can include (1) using a transportation network on which different modes, carriers, services and equipments are available for transporting the goods; (2) a rating structure for the transportation service that depends on the mode, carrier, service, and equipment dimensions; (3) flexible or hard time-window constraints on when the orders are to be picked up and delivered, and when the facilities of interest are open for service, pick-up or drop-off; (4) various flexible or hard compatibility constraints such as item-vehicle, facility-facility, item-facility, customer-facility, region-facility and so on.

Three main modes (or types) of trucking carrier exist in the road transportation system. The modes include truckload (TL), less-than-truckload (LTL), and parcel (also known as small package or express). Each mode has a different manner of operation and a different price point. Major U.S. truckload carriers include J.B. Hunt, Schneider National, and Werner Enterprises. Their service involves a shipper essentially hiring truck and a driver to travel between two points. The shipper dictates how the truck gets from the origin to the destination. TL mode offers the lowest rates per unit of cargo but if a truck in not full or nearly-full, smaller shipments or loads can travel more economically via LTL carriers.

LTL carriers like Yellow Freight and Roadway Express typically operate fixed, scheduled hub-and-spoke truck networks over which individual pieces of cargo can travel between various origins and destinations. LTL costs per unit of cargo, while higher than those for nearly-full TL moves, are much lower than those of parcel carriers. Parcel carriers include UPS, FedEx, and DHL.

The transportation planning problem may be thought of as being comprised of two inter-dependent sub-problems, load-building and carrier selection. Load-building involves exploiting economies of scale to achieve lower costs by adopting different simple aggregation strategies as well as complex route-building and hubbing strategies to consolidate smaller shipments into larger loads. Trips are then defined for transporting the loads from a source to a destination. Carrier-selection involves determining the carrier that could service the loads built in load-building resulting in a lowest cost solution subject to carrier-related flexible or inviolable constraints.

In prior systems, an operator would manually assign a carrier to a load simply by selecting the lowest cost carrier for that individual trip. However, when a group of trips are involved, selecting a carrier in this manner may not result in an optimal total cost (e.g. global cost) for the group of trips.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
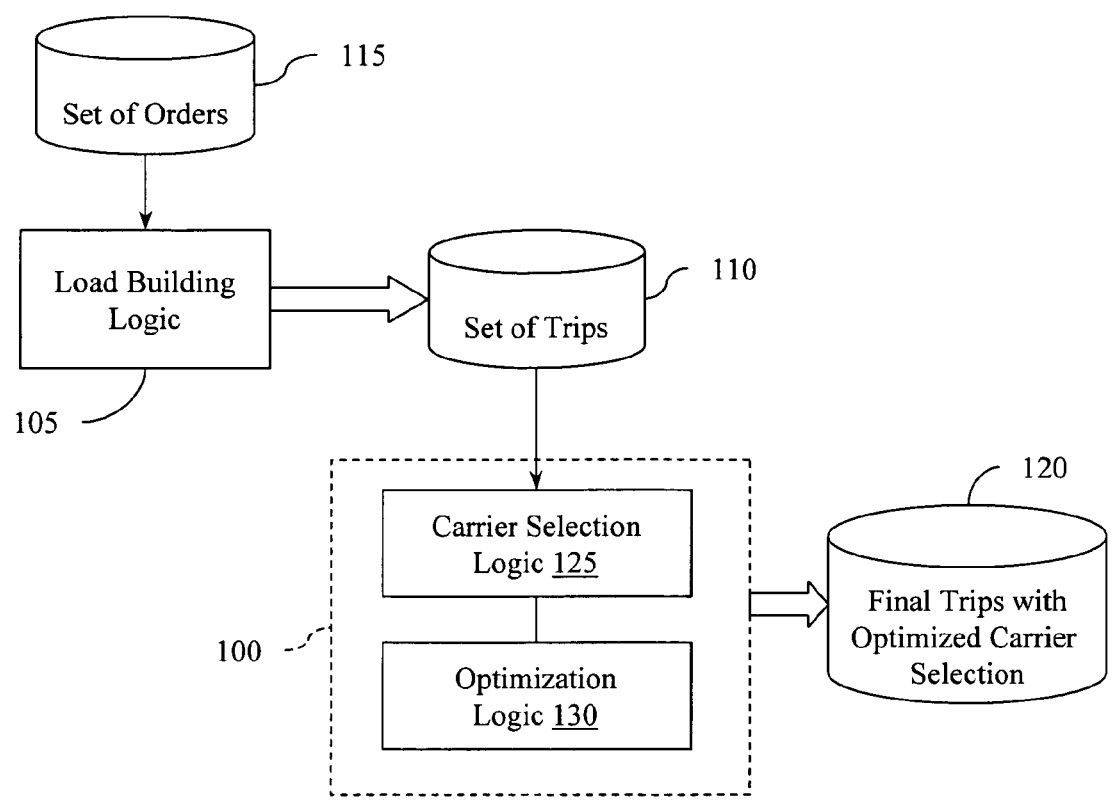
FIG. 1 illustrates an example embodiment of a carrier selection optimization product.

Example systems, methods, computer-readable media, software, and other embodiments are described herein that relate to optimizing carrier selection for a transportation planning system. In one embodiment, given a set of trips that have been defined to transport a set of configured loads, a carrier selection logic can be provided that is configured to analyze the set of trips and attempt to repair or cure one or more constraint violations that may exist in one or more of the trips. For example, the repair may include attempting to reassign a carrier (e.g. carrier/service/vehicle type) that is assigned to a trip to a different carrier. Such a reassignment may incur an increase in the individual trip cost but may reduce the overall constraint violations for the set of trips and may reduce the overall global cost for the set of trips. As will be described in greater detail herein, carrier selection involves determining the carrier that could service one or more loads in a lowest cost solution subject to carrier-related flexible or inviolable constraints.

In one example, the global cost for a set of trips can include an actual cost of each individual trip plus any penalty cost for violating constraints. The constraints may include local constraints and global constraints, which may be flexible or inviolable constraints. Each constraint can have an associated penalty cost for violating the constraint that can be user defined.

The present systems and methods apply to a shipper, meaning a person or company who needs goods moved. It will be appreciated that the shipper is different than a carrier who is a company that moves the goods. Thus, the present disclosure should be read from the point of view of a system that can be used to solve transportation planning problems for a shipper.

In another embodiment, a continuous move logic can be provided that is configured to identify "continuous moves". A continuous move includes a sequence of loads that a single truck can serve as one mission. For example, after optimized loads are constructed, there may be opportunities to combine the loads into continuous moves. Continuous moves bares resemblance to multi-stop loads, with the primary difference being that continuous moves often include empty legs and include a complete turnover of cargo at some point. Different carriers may have different pricing schemes for continuous moves and/or cost savings that may affect the global cost of a set of trips.

Thus, example systems, methods, media, and other embodiments described herein relate to transportation planning and optimization of global costs through repair-based carrier selection. Example systems and methods may employ multiple, parallel, configurable, problem-solving sequences that provide optimal or near optimal sub-solutions to transportation planning problems while considering multiple constraints and/or cost factors. Example systems and methods may then manipulate (e.g., partition) the sub-solutions to facilitate creating optimal or near optimal overall solutions by selecting from the sub-solutions. In some examples, optimal and/or near optimal refers to solutions that facilitate reducing transportation costs and/or improving a utility measure for a transportation plan.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Load", in the context of transportation planning and as used herein, refers to a set of shipments assigned to a vehicle and assigned a schedule for delivery. A load may refer to a single stop load, a multi-stop load, and the like. A load may also refer to a consolidated group of shipments that are not necessarily a full truckload. A shipment larger than one truckload may be split into multiple loads.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, selecting, determining, outputting, or the like, refer to actions and processes of a computer system, logic, processor, or similar electronic device that manipulates and transforms data represented as physical (electronic) quantities.

With reference to FIG. 1, one embodiment of an optimization product 100 is illustrated that can be used with or part of a transportation planning system 105. The product 100 can be configured to optimize a selection of carriers for a set of trips 110 that are created by the transportation planning system 105. For example, the transportation planning system 105 can include a load building logic that, based on a set of orders 115, attempts to configure or otherwise build optimal loads that are to be transported and are defined by the set of trips 110. A trip can define a route for transporting a load from a source to a destination including zero or more stops or legs in between.

Each trip can have an assigned carrier who is responsible for delivering the load. The carrier assignment can include one or more parameters like "carrier/service/vehicle type" (abbreviated as C/S/V). The "carrier" identifies the company that provides the transportation services. The "service" can identify a particular way of delivery. For example, a parcel carrier may provide services like "next day air" or "standard delivery". A Less Than Truckload (LTL) carrier may provide standard, expedited, or deferred delivery services. A Truckload (TL) carrier may provide single driver or team driver services and the like. The "vehicle type" is, of course, the type of vehicle to be used.

With continued reference to FIG. 1, in one embodiment, the transportation planning system 105 can be implemented using the example embodiments described in U.S. patent application entitled "Transportation Planning with Parallel Optimization" as referenced above. Initially, the load-building logic can select a primary or most likely carrier, service, and vehicle for truckloads between any two facilities in the planning scope (e.g. the set of trips 110).

Based on the defined set of trips 110, the optimization product 100 is configured to reduce a global cost for the set of trips 100 by reassigning selected carriers in order to repair or cure certain constraint violations. Upon completion, a final set of trips 120 can be outputted that include optimized carrier selection. In one example, the product 100 can include a carrier selection logic 125 and an optimization logic 130.

The carrier selection logic 125 can be configured to modify selections of carriers assigned to the set of trips 110. The set of trips can have an associated global cost that is based on at least a sum of single trip costs (e.g. actual trip costs plus penalty costs for constraint violations). As previously described, each trip can include an assigned carrier, a trip cost, and one or more trip constraints, which are also referred to as local constraints since they only apply to a particular trip. The carrier selection logic 125 can be further configured to change a carrier assigned to a trip to a different carrier in order to cure one or more violations in one or more trip constraints associated to a trip. This can be performed programmatically to change the carrier assignments of multiple trips in view of one or more trip constraints.

The optimization logic 130 can be configured to determine an impact on the global cost associated to the set of trips 110 based on each change of carrier assignment for each single trip. For example, in some cases, changing a carrier for a trip to a more costly carrier may increase the cost of a particular trip yet may repair certain constraint violations that can reduce the overall global cost for the set of trips 110. This process can be repeated for multiple trips in the set of trips 110 and may analyze the impact of multiple carriers from an available list of carriers. The optimization may be performed serially, in parallel, using multiple processes, and the like to generate and output optimized carrier assignments 120 for the set of trips 110 based on the global cost.

In one example, a trip cost for an individual trip can include a sum of an actual cost of the trip and a local penalty cost for violations of one or more trip constraints. As previously described, each trip may have a variety of local constraints, meaning that the constraints apply only to that trip. The trip may have zero or more violations in those constraints after its load has been built and the trip has been defined. Examples of local constraints and global constraints will be described in greater detail with reference to FIG. 2. The optimization product 100 can attempt to repair certain constraint violations by determining which carrier/service/vehicle type can be assigned to a selected trip that will improve the overall global cost of all trips in the problem space. In one example, groups of trips can be related and be processed based on a common global cost of the related trips.

For example, suppose the problem space includes 20 trips identified as trips T1-T20. Suppose that the initial carrier selection has assigned carrier ABC to trips T1-T10 and carrier XYZ to trips T11-T20. If carrier ABC has a vehicle availability constraint of nine truckloads, then group T1-T10 violates that carrier constraint by one truckload and a penalty cost can be associated to the global cost of trips T1-T10. The carrier selection logic 125 can repair or otherwise cure that constraint violation by reassigning the carrier for one of the trips T1-T10. If the carrier ABC assigned to trip T10 is changed to carrier XYZ, trip T10 now becomes related to the group of trips T1-T20 since they have the same carrier.

Although changing carriers may increase the actual trip cost for trip T10, the global cost of trips T1-T9 might be reduced due to the elimination of the constraint violation of the number of truckloads for carrier ABC. Thus, if the global cost for all trips T1-T9 is reduced, then optimization logic 130 can determine that changing the carrier selection for trip T10 is a good idea and the change can be made. Similar analysis can be performed for other constraint violations and carrier selection choices where changing a carrier assigned to a trip can repair a constraint violation and improve the total quality of the transportation plan.

With the carrier selection logic 125 and optimization logic 130, the set of trips 110 can be programmatically analyzed to test multiple carrier selection changes while determining the impact the changes have on numerous local and/or global constraints that apply to an individual trip and/or to multiple trips in a group. The optimization product 100, in one example, can be embodied as a computer-readable medium configured to provide processor executable instructions that implement the carrier selection logic 125 and the optimization logic 130, or can be embodied as software that can be provided by a computer-readable medium.

Figure 2:
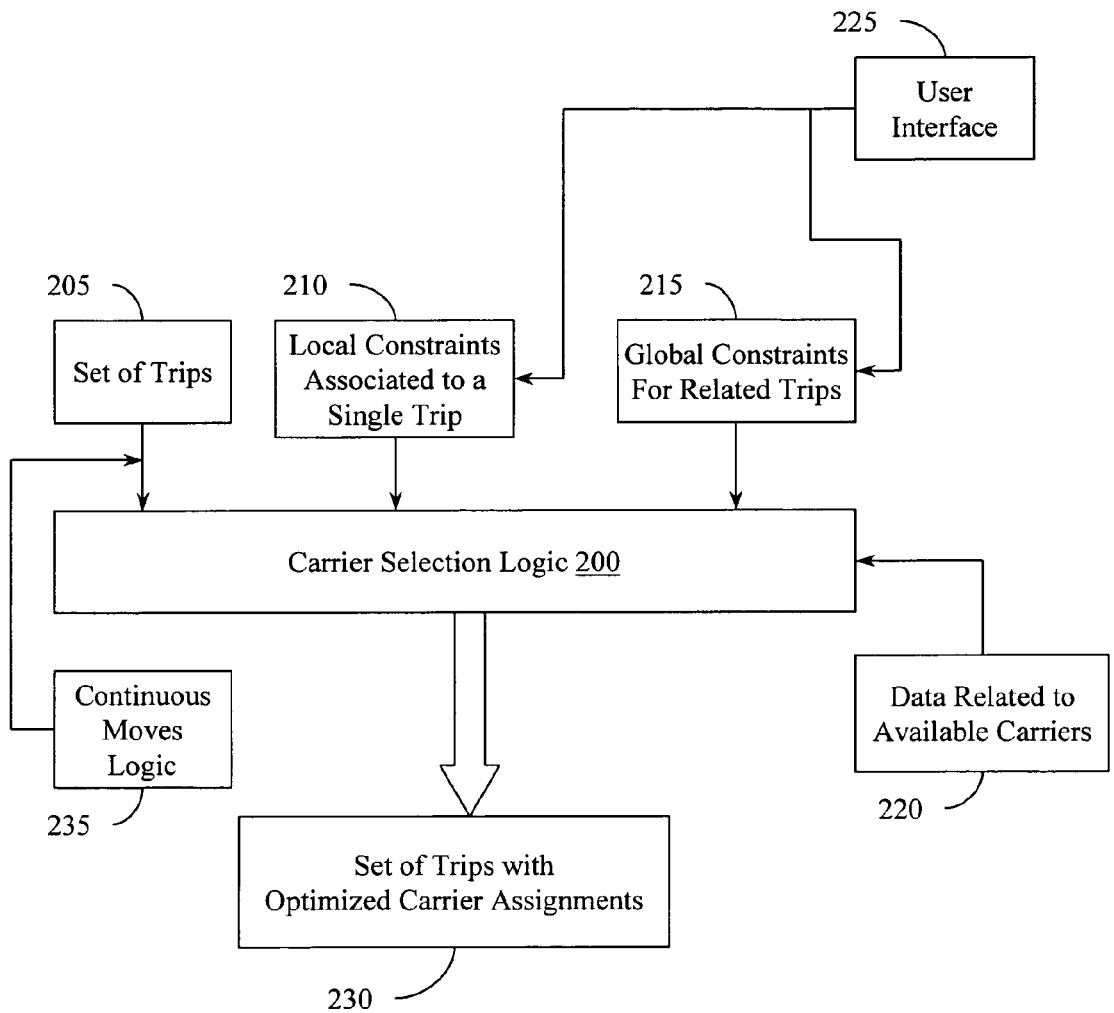
FIG. 2 illustrates an example embodiment of a carrier selection input and output.

Illustrated in FIG. 2 is one example embodiment of example inputs and outputs to a carrier selection logic 200 that can be configured to optimize carrier selection for a set of trips 205. The set of trips 205 may be initially configured by a load-building algorithm or other logic that can configure one or more truckloads from a set of shipping orders. Each trip can include a route between a source location and a destination location and with zero or more stops or legs in between.

Each trip can initially be assigned a carrier to transport the load. The carrier assignment can include parameters such as carrier/service/vehicle type (C/S/V) as previously described. Initially, carrier assignment may include selecting a default carrier for each trip or for a related set of trips. The default carrier may be a pre-designated primary carrier and/or may be determined based on a lowest-cost analysis for a trip. As will be described in greater detail with reference to the carrier selection logic 200, the lowest-cost carrier for a trip may not provide the optimal global cost solution for the set of trips 205.

When determining (e.g. rating) the optimal carrier selections for the set of trips 205, the carrier selection logic 200 can consider local constraints 210 and/or global constraints 215. The carrier selection logic 200 can be configured to identify violations from the local constraints 210 and/or the global constraints 215, attempt to repair any constraint violations by making carrier re-assignments to the trips, and determining the impact on a global cost for the set of trips when different carriers are selected.

As an example of local constraints 210, a local constraint can be a pre-determined constraint, rule, or condition that applies to a single trip. The local constraints 210 may include carrier-related constraints like lane definitions that may be provided by carriers for rating different carriers depending on their service type and mode, carrier load rules, dimensional constraints on the size dimensions of loads, capacity of a vehicle, and/or other types of constraints that may be applied to a trip. Additional examples of constraints are provided in subsequent examples. Examples of local constraints that can apply carrier (C/S/V) selection, which are local to a particular trip, can include compatibility of a vehicle with the facilities visited, compatibility of the carrier with the item(s) transported, and/or compatibility of the item(s) to be transported with the vehicle.

Referring to the global constraints 215, example global constraints can be constraints that apply to a group of related trips. For example, trips can be related if they have the same carrier assignment. Example global constraints can include vehicle availability conditions, contract commitments between the shipper and the carrier, and/or other types of constraints that can be applied to a group of trips that share lane-group definitions set by a carriers. In that regard, carrier data 220 (related to available carriers) can be inputted to or accessed by the carrier selection logic 200. The carrier data 220 can include a list of available carriers that can be selected from as well as carrier-related restraints, pricing information, vehicle information, facility information, and the like. The carrier data 220, in some instances, may be provided by the carriers and/or can be collected and inputted into a data store.

Optionally, a user interface 225 can be provided that is configured to allow a user to manipulate the local constraints 210 and the global constraints 215. For example, using the interface 225, a user is able to configure selected local constraints and/or global constraints to be turned on/off. In one example, if a constraint is turned on as a "soft" constraint, meaning that it may be violated but with a penalty, the constraint can be assigned with penalty costs for violating a constraint. Constraints may be classified having different levels of importance where a more important constraint may have a higher penalty cost associated to it for violating the constraint. For example, a constraint may be classified as a hard constraint, meaning that it is important and inflexible, and can have a very high or infinite penalty cost associated to it. A soft constraint can be more flexible and may be assigned a penalty cost that is based on a penalty function. For example, the penalty function can be based on a flat fee, a linear function, a non-linear function, a step-wise linear function, and the like. Some constraints can be unimportant and can be ignored, thus, not impacting the global cost.

Referring to the carrier selection logic 200, the logic 200 can be configured to analyze the set of trips 205 in view of the local constraints 210 and global constraints 215 and attempt to generate optimized carrier assignments 230 for the set of trips. The outputted solution set of trips 230 should provide an optimized global cost for the set of trips 205, and if there are multiple groups of related trips, generate an optimized global cost for each independent group of trips.

Generally speaking, the carrier selection logic 200 can be configured to identify local and/or global constraint violations that are associated with one or more trips and attempt to repair or otherwise cure the constraint violation by selecting a different carrier to service the trip. The carrier selection logic 200 can programmatically rate different carriers based on the inputted set of trips 205 and determine the lowest cost carrier in view of global constraints and global costs for the set of trips.

In one example, the carrier selection logic 200 can include logic to evaluate an actual cost and any penalty costs associated with violating local constraints for each trip. Different carriers can then be selected from an available list of carriers and a trip can be reevaluated for its actual cost and penalty costs. Thus, the analysis looks at any local constraint violations for each trip and tries to repair the violation by selecting a different carrier for that trip. With the re-assigned carrier, the new trip cost can be calculated and the logic 200 can determine the impact of the carrier re-assignment on the global cost of all related trips. If the global cost is reduced the re-assignment can be kept and the next trip can be analyzed.

It will be appreciated that a variety of optimization programs or algorithms can be implemented in the carrier selection logic 200 that is capable of processing potentially very large numbers of local and global constraints in order to determine an improved global solution for the set of trips 205. The algorithms may be implemented, for example, in processes including, but not limited to, linear programming processes, simplex method processes, dynamic programming processes, greedy algorithm processes, look ahead processes, divide and conquer processes, branch and bound processes, savings-based processes, heuristic-based processes (e.g., bin packing heuristics) and the like.

With further reference to FIG. 2, in another embodiment, a continuous moves logic 235 can be provided that is configured to identify a continuous move from the set of trips 205 prior to being processed by the carrier selection logic 200. For example, a continuous move is a connection of two or more truckloads with an unloaded or empty leg (called "deadhead") between two loaded truckload moves. Some continuous moves may be discounted by carriers on some lanes if the continuous move offers opportunities to better track and utilize vehicle inventory for a carrier. Consolidating a group of trips into a continuous move may offer an improved solution prior to the carrier selection processing by logic 200.

In addition to the carrier-related constraints discussed previously, carriers may also specify various constraints with regard to continuous moves. By identifying opportunities for continuous moves, the overall global cost for the set of trips may be reduced. Example continuous moves constraints may include:

Continuous moves allowed/not allowed
Maximum continuous move distance
Maximum continuous move time
Maximum deadhead distance
Maximum deadhead time
Continuous move free deadhead mileage
Continuous move rate variant: rate basis or discount basis
Continuous move discount percent
Continuous move first load discounted/not discounted
Minimum for continuous move pricing: distance
Minimum for continuous move pricing: time Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

Figure 3:
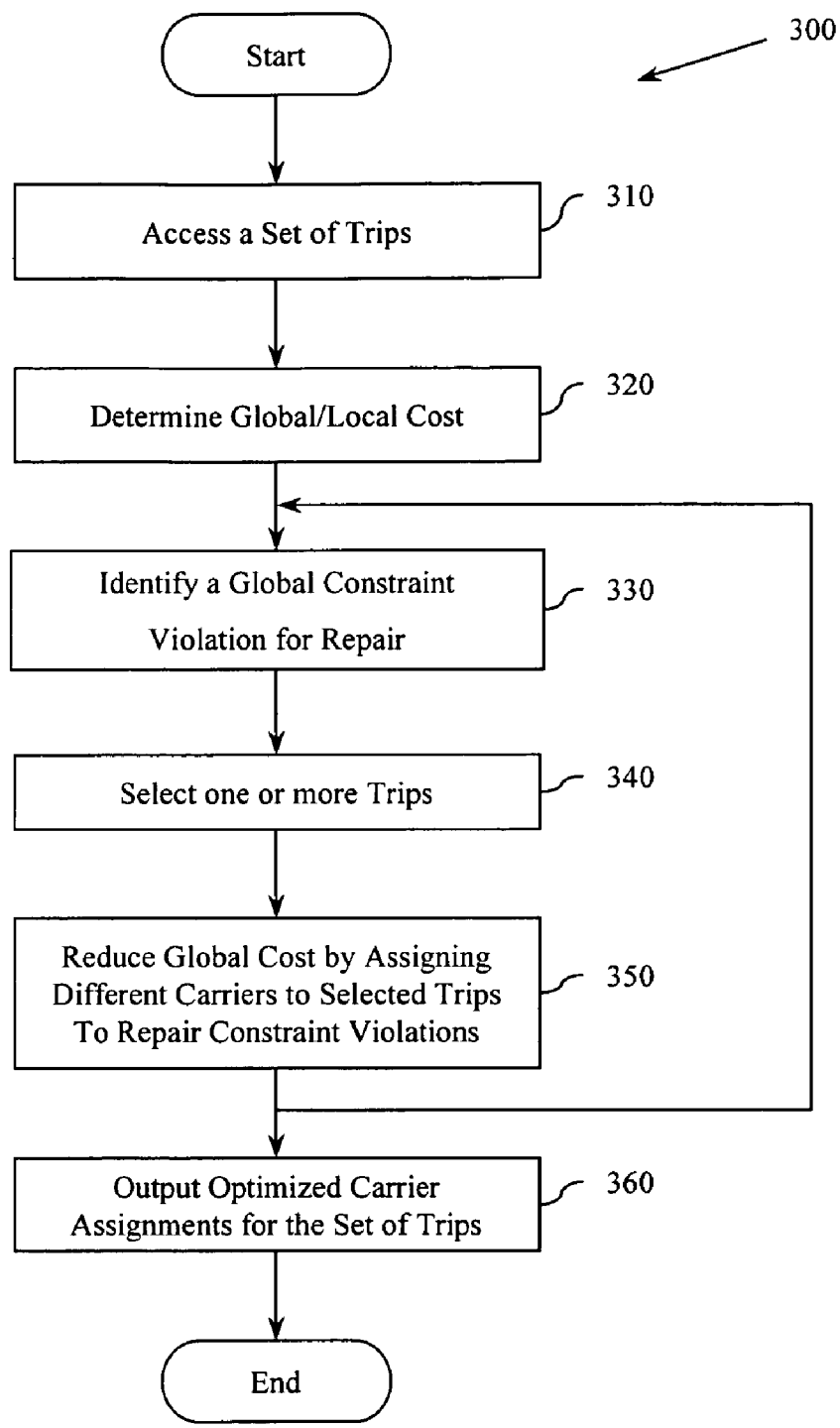
FIG. 3 illustrates an example methodology that can be association with repair-based carrier selection.

Illustrated in FIG. 3 is an example methodology 300 that can be associated with optimizing carrier assignments for a set of trips. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits such as an analog circuit, a digital signal processor circuit, an application specific integrated circuit (ASIC), or other logic device. All illustrated diagrams are not intended to limit the implementation of the described examples. Rather, the diagrams illustrate functional information one skilled in the art could use to design/fabricate circuits, generate software, or use a combination of hardware and software to perform the illustrated processing.

With reference to FIG. 3, the methodology 300 can be associated with optimizing carrier assignments for a set of trips. The methodology 300 may initially begin by accessing a set of trips, which may include receiving the set of trips as input data (Block 310). A global cost and/or local costs for the set of trips can then be determined (Block 320). In one example, the global cost can be determined by summing the total cost of each trip in the set of trips where the total cost of an individual trip can be determined by the actual cost of the trip plus any penalty cost for local constraint violations. The methodology 300 may also determine groups of related trips within the set of trips. For example, all trips assigned to the same carrier and/or within the same geographical region can be designated as a related group. For each related group, a global cost can be determined. A list of candidate C/S/V and the local cost of each candidate C/S/V can be prepared for each trip. This list can be sorted in an increasing order of total local cost (=actual transportation cost+penalty cost for violating local constraint), for example. The C/S/V corresponding to the lowest cost C/S/V or primary C/S/V becomes the starting point of the following repairing process.

At block 330, the process can select a global constraint violation for repair. In one example, if there is no global constraint being violated, the above starting point is used as a global optimal. The process can attempt to pick the next global constraint that is violated and that incurs the largest penalty among all other global constraint violations. For example, global constraint violations can be selected for repair in a decreasing order of their importance.

The methodology may then select one or more trips (Block 340) and attempt to reduce the global cost by assigning different carriers to selected trips to repair constraint violations (Block 350). This may involve a repetitive process of selecting different carriers based on whether the selection will repair any constraint violations and then determining the impact on the global cost.

Selecting different carriers may also be performed in an attempt to repair any global constraint violations that may exist. As previously explained, global constraint violations may involve violations with vehicle availability for a particular carrier and/or contract commitment violations with a carrier. The above selection process can involve a comparison of moving a carrier assignment to a next candidate C/S/V for all involved trips for a current global constraint to see which trip and which candidate C/S/V movement incur the least local and global cost increase. The process can return to block 330 and repeat for a different global constraint repair until a selected threshold improvement in global cost is achieved. Once an improved solution has been found, optimized carrier assignments can be outputted for the set of trips (Block 360). The optimization may continue based on predefined threshold values of improvement or other types of thresholds or until all global constraints are successfully repaired.

Figure 4:
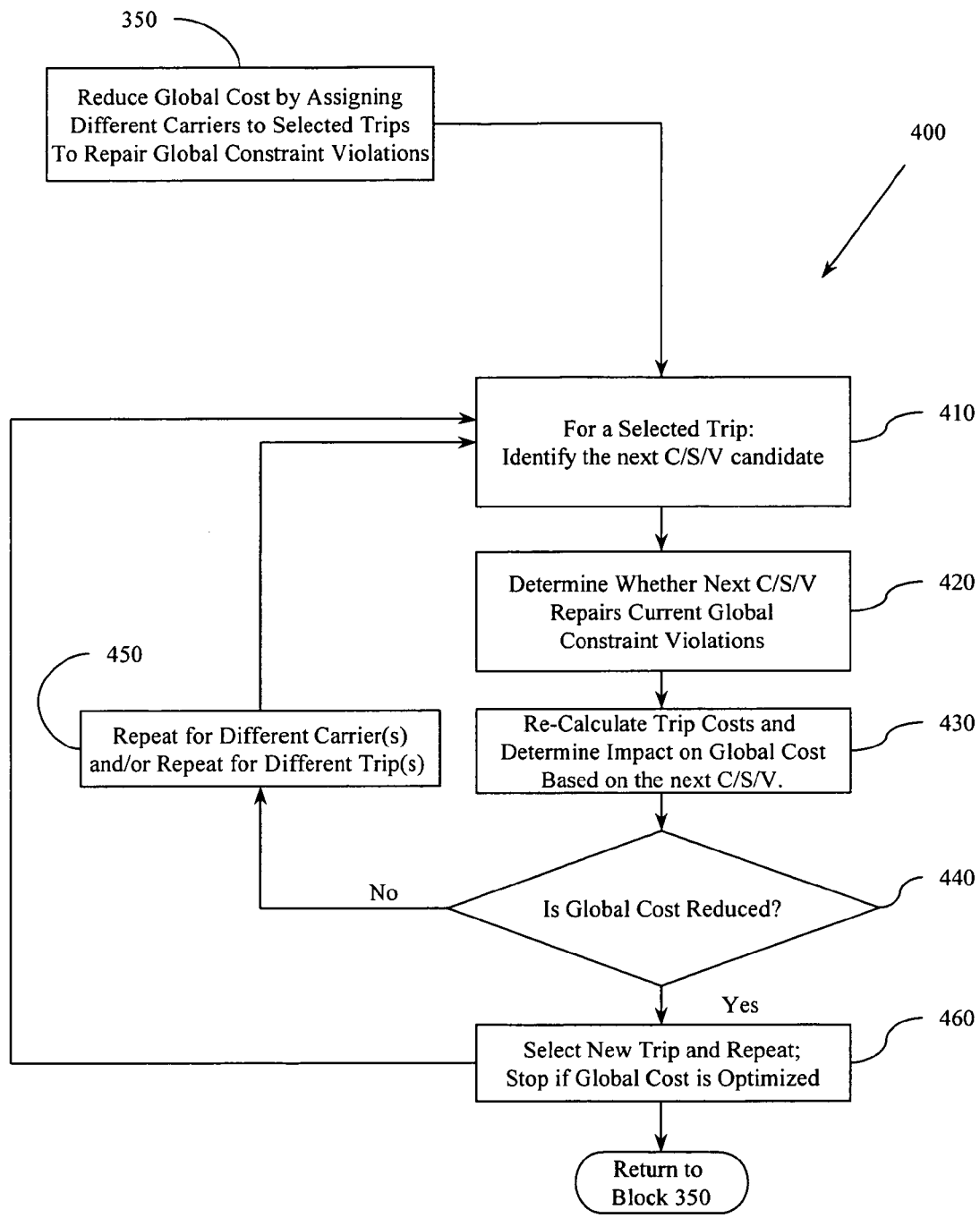
FIG. 4 illustrates an example embodiment for block 350 from FIG. 3.

With reference to FIG. 4, one example embodiment of a methodology 400 is illustrated that can be implemented for the Block 350 from FIG. 3. For example, once a global constraint violation has been selected for repair in block 340, for a selected trip, a next carrier (C/S/V candidate) can be identified for the trip (Block 410). In one example, candidate carriers can be selected from a pre-determined list of available carriers. The methodology 400 can attempt to repair any constraint violations by selecting a different candidate carrier for the trip. It can then be determined if using the next C/S/V candidate for the selected trip repairs current global constraint violations (Block 420). Trip costs can be re-calculated and the impact on global cost can be determined based on using the next C/S/V (Block 430). If the global cost is not improved at Block 440, the candidate carrier (C/S/V) is not selected and the methodology can be repeated for different carriers, and/or repeated for different trips (Block 450). If the global cost is improved (e.g. reduced) at Block 440, the methodology 400 can proceed to select a new trip and repeat (at Block 460). It is noted that for a group of trips that are part of a continuous move, reassigning the carrier for one of the trips requires that the other trips also be reassigned, otherwise the continuous move benefit is lost. The methodology 400 may also stop processing at block 460 if the global cost is optimized, for example, by meeting a predefined threshold. The process then can return to Block 350 in FIG. 3 and continue to repair another constraint violation. The ordering/sequence of repairing global constraints and the ordering of C/S/V and its local cost for each trip can lead to algorithmic convergence of the solutions more quickly.

In another example description of the processes shown in FIGS. 3 and 4, the outmost repetitive loop in FIG. 3 is performed against violated global constraints in a decreasing order of their importance (e.g. more costly violations are repaired first). At the moment of repairing a global constraint violation, the process can evaluate which trip(s) should switch to a different carrier just to avoid such global constraint violation. This decision can be made based on a comparison of cost increase for such a switch for each involved trip. The process picks (or the system is configured to pick) the one carrier assignment that incurs the least increase of local cost and global cost. If such increase is higher than the penalty for a current global constraint to be repaired, the process/system simply skips repairing the current constraint violation, and moves to the next constraint violation. Worth of mentioning, the switching of C/S/V for each trip are only limited to those candidate C/S/Vs populated in the beginning. Impact for global cost of other global constraints is calculated dynamically while local cost is cached upfront.

In the described examples, various constraints can be involved during carrier selection. Determining the carrier that could service a set of trips/loads resulting in the lowest cost solution may be subject to one or more of the carrier-related flexible or inviolable constraints listed in Table 1:

TABLE 1

Example Constraints

Lane definitions provided by carriers for rating depending on the service type, mode and carrier.
Carrier load rules, e.g.:
  Maximum number of stops
  Allowed to intersperse pickups and drop-offs, or require all pickups before any drop-offs
  Maximum total distance
  Maximum total time
  Maximum total distance per day
  Minimum layover time
  Maximum driving time per day
  Maximum on-duty time per day
  Pallet exchange allowed by the carrier or not
Dimensional constraints on the size dimensions of the loads.
Different vehicle types provided by the carrier
Capacity of the vehicle, e.g.:
  Exterior length, width, and height
  Interior length, width, and
  Maximum effective capacity
  Weight capacity
  Pallet capacity
  Mission dependent effective volume capacity
  Door width and door height
Availability of the vehicles.
Compatibility of the vehicle with the facilities visited.
Compatibility of the carrier with the item transported.
Compatibility of the item to be transported with the vehicle.
Pick-up lead times
Appointments of carriers with facilities
Transit times depending on the mode and service type.
Contracts made by the shipper in terms of the absolute or percentage of loads, revenue or weight committed to be tendered to a carrier on a lane or a group of lanes, for a specified rolling frequency horizon.

In accordance with another example embodiment, a repair-based carrier selection system can be configures to operation as follows using references to components in FIG. 1. A load-building algorithm (e.g. as part of the transportation planning system 105) can be configured to determine a "primary" or most likely carrier, service and vehicle (C/S/V) for truckloads between any two facilities in the planning scope. The primary carrier/service/vehicle (C/S/V) can determined based on a lowest-unit loaded distance cost of driving between two destinations based on a distance measure input to the algorithm. Truckloads can be built between an origin and a destination and rated based on a rating structure on a lane offered by the primary carrier, service and vehicle type. Less-than-truck-loads (LTLs), air loads and parcels are built and rated based on the lowest cost over all carriers and services offered between an origin and a destination.

Carrier-related constraints (except—the availability of the vehicles, compatibility of the vehicle with the facilities visited, compatibility of the carrier with the item transported, compatibility of the item to be transported with the vehicle and commitment contracts) are considered in the form of hard constraints or as flexible constraints in terms of penalty for violations, for the C/S/V of the primary carrier for truckloads or for the lowest cost carrier/service for other modes. The load-building and mode-selection decisions can be made based off of these costs and a single set of trips that can solve the transportation problem are input to the repair-based carrier selection logic (e.g. optimization product 100, carrier selection logic 125).

The carrier-related constraints not considered during load-building may include local C/S/V selection constraints and global C/S/V selection constraints. Local C/S/V selection constraints are local to a particular trip and can include: compatibility of the vehicle with the facilities visited, compatibility of the carrier with the item transported, and/or compatibility of the item to be transported with the vehicle. Example global C/S/V selection constraints may include: vehicle availability, and/or contract commitments between a shipper and a carrier. Global constraints relate to all trips that share lane-group definitions of the carriers on which the vehicle-availability or commitment rule is defined.

The sum of the load-building cost as well as the local C/S/V selection constraint violation penalty cost (a large value if a constraint is inflexible) are evaluated for every or many available assignments of a C/S/V to a trip. These assignments can be arranged in an ascending order of the total evaluated "local" cost of assignment. For continuous moves (if available), the cost of assignment of each constituent trip can be the assignment cost of the continuous move to the C/S/V. The lowest total-local assignment cost for each trip provides a lowest cost solution to the C/S/V selection problem ignoring the global constraints.

Next, repairs to violations of global constraints can be performed. If the vehicle-availability is an inflexible constraint (e.g. a high penalty cost), the system can attempt to repair vehicle availability violations first, otherwise it can repair commitment rule shortcomings first. The algorithm can evaluate a total violation global penalty cost due to the vehicle availability over-utilizations, and the contract commitment shortcomings of all the trips in the plan. This provides the global C/S/V constraint violation cost. The algorithm "repairs" the violations of the global C/S/V constraints by attempting to reassign the trips to the next C/S/V assignment in a list of candidate C/S/V assignments. The candidate C/S/V assignments can be sorted by increasing total cost of assignment.

While repairing vehicle availability constraints, for each trip leading to an over-loading of the vehicle availability, the non-global total cost increase of moving the trip to another C/S/V can be evaluated. The candidate trips 110 that may be offloaded to another C/S/V are sorted by an increasing order of non-global total cost increase. Then, the first trip in the candidate list is attempted to be offloaded to its next designated C/S/V assignment. If the increase in the non-global total cost is less than the decrease in the total global violation penalty cost, then the trip is reassigned to the new C/S/V. Otherwise, another C/S/V (with presumably greater total non-global cost) can be re-designated as the possible reassignment for the trip, and the candidate off-loadable trips are re-sorted by the increasing order of non-global total cost increase. This repair algorithm terminates when every or a substantial number of vehicle availability constraints are satisfied, or when reassignment of any candidate trip to another C/S/V is not possible because the move would not result in an improvement in the total (actual+local penalty+global penalty) cost solution.

While repairing contract commitment shortcomings, the commitment rule constraints can be repaired in a decreasing order of importance of the rule. Any trip that falls within a geographical definition of a commitment rule and may be moved from its current C/S/V assignment to the C/S/V of the commitment rule is a candidate for C/S/V reassignment. All such candidate trips can be sorted by an increasing order of non-global total assignment cost-increase. If the lowest non-global total assignment cost increase for the trip with a lowest cost is lesser than a decrease in global C/S/V selection penalty cost, then the trip is moved to the C/S/V of the commitment rule being repaired. Otherwise, the next C/S/V assignment that matches the C/S/V of this commitment rule becomes the next C/S/V reassignment possibility for the trip and the list of candidate trips are re-sorted. The repair algorithm can terminate when all or most of the contract commitments are honored or when reassignment of any candidate trip to the C/S/V of the contract is not possible because the move would not result in an improvement in the total (actual+local penalty+global penalty) cost solution.

For a continuous move, the cost of reassignment applies to reassignment of all the trips in the continuous move to the new C/S/V, and every successful reassignment of a trip in the continuous move implies the reassignment of the C/S/V of every trip in the continuous move.

Figure 5:
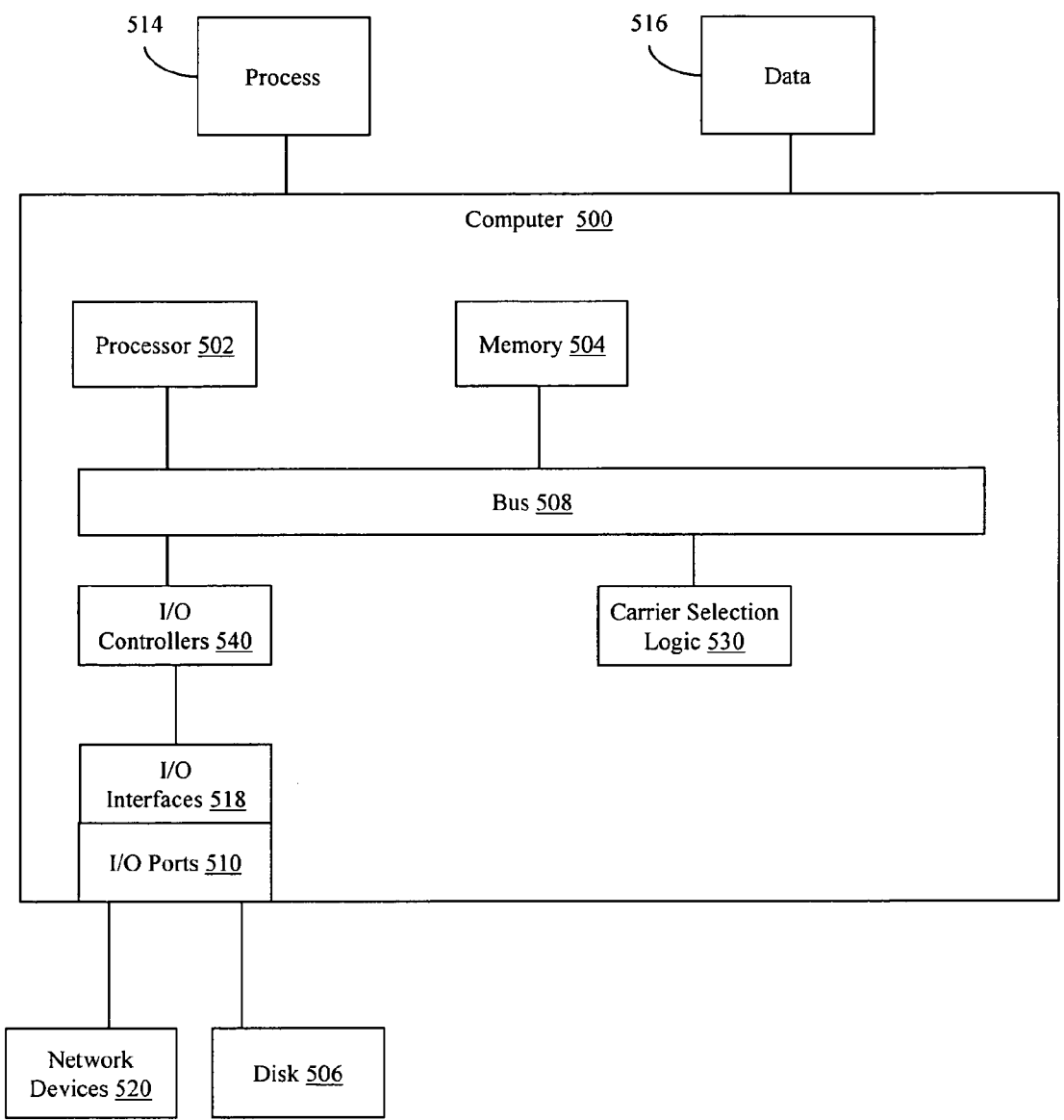
FIG. 5 illustrates an example computing environment in which example systems and methods illustrated herein can operate.

FIG. 5 illustrates an example computing device in which example systems and methods described herein, and equivalents, can operate. The example computing device may be a computer 500 that includes a processor 502, a memory 504, and input/output ports 510 operably connected by a bus 508. In one example, the computer 500 may include a carrier selection logic 530 configured to facilitate repair-based carrier selection for a set of trips that can optimize or otherwise improve a global cost solution for the set of trips. The carrier selection logic 530 can be implemented similar to the optimization product 100 described in FIG. 1 and/or the carrier selection logic 200 described in FIG. 2, and/or similar to the other systems and methods described herein, and their equivalents.

Generally describing an example configuration of the computer 500, the processor 502 can be a variety of various processors including dual microprocessor and other multi-processor architectures. The memory 504 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 506 may be operably connected to the computer 500 via, for example, an input/output interface (e.g., card, device) 518 and an input/output port 510. The disk 506 can include, but is not limited to, devices like a magnetic disk drive, a solid state disk drive, a floppy disk drive, a tape drive, a Zip drive, a flash memory card, and/or a memory stick. Furthermore, the disk 506 can include optical drives like a CD-ROM, a CD recordable drive (CD-R drive), a CD rewriteable drive (CD-RW drive), and/or a digital video ROM drive (DVD ROM). The memory 504 can store processes 514 and/or data 516, for example. The disk 506 and/or memory 504 can store an operating system that controls and allocates resources of the computer 500.

The bus 508 can be a single internal bus interconnect architecture and/or other bus or mesh architectures. While a single bus is illustrated, it is to be appreciated that computer 500 may communicate with various devices, logics, and peripherals using other busses that are not illustrated (e.g., PCIE, SATA, Infiniband, 1394, USB, Ethernet). The bus 508 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 500 may interact with input/output devices via i/o interfaces 518 and input/output ports 510. Input/output devices can include, but are not limited to, a keyboard, a microphone, a pointing and selection device, cameras, video cards, displays, disk 506, network devices 520, and the like. The input/output ports 510 can include but are not limited to, serial ports, parallel ports, and USB ports.

The computer 500 can operate in a network environment and thus may be connected to network devices 520 via the i/o devices 518, and/or the i/o ports 510. Through the network devices 520, the computer 500 may interact with a network. Through the network, the computer 500 may be logically connected to remote computers. The networks with which the computer 500 may interact include, but are not limited to, a local area network (LAN), a wide area network (WAN), and other networks. The network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 520 can connect to WAN technologies including, but not limited to, point to point links, circuit switching networks like integrated services digital networks (ISDN), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium that provides processor executable instructions for causing a computer to perform a method of transportation planning, the method comprising:

selecting a primary carrier for each trip in a set of trips, where a trip defines a route for transporting a load from a source to a destination and includes an assigned carrier, a trip cost, and one or more local trip constraints, and selecting the primary carrier for each trip based on a lowest cost for the trip based on the one or more local trip constraints;

modifying selections of the primary carriers assigned to the set of trips, the set of trips having an associated global cost being based on at least a sum of single trip costs, global penalty costs for violations of one or more global trip constraints and local penalty costs for violations of one or more local trip constraints;

change changing the primary carrier for each trip to a different carrier in order to cure one or more violations in the one or more local trip constraints associated with the trip and one or more global trip constraints associated with the set of trips, and programmatically changing the carrier assignments of multiple trips in view of the one or more trip constraints; and determining an impact on the global cost associated with the set of trips based on each change of carrier assignment for each single trip and to output optimized carrier assignments for the set of trips based on the global cost.

2. The non-transitory computer-readable medium of claim 1, where the carrier assignment includes an assignment of a carrier, a service, and a vehicle type for transporting a load.

3. The non-transitory computer-readable medium of claim 1 further including instructions for allowing a selected trip constraint associated with a selected trip to be assigned a penalty cost for violating the selected trip constraint and allowing a user to turn on/off a subset of local/global constraints related to carrier selection.

4. The non-transitory computer-readable medium of claim 3 where the instructions are configured to allow a trip constraint to be classified as a hard constraint, a soft constraint, or an ignorable constraint, and where the hard constraint can be assigned an infinite penalty cost for violating the hard constraint, and the soft constraint can be assigned a penalty cost based on a penalty function.

5. The non-transitory computer-readable medium of claim 1 further including identifying a continuous move that includes a sequence of loads that a single vehicle can transport as one mission.

6. A computer implemented method, comprising:

selecting a primary carrier for each trip in a set of trips, a carrier selected for transporting a load, the primary carrier being selected based on one or more local trip constraints, and a trip cost;

determining, using at least a computer processor, a global cost for the set of trips based at least in part on a sum of the trip cost of each trip and global penalty costs for violations of one or more global constraints that apply to the set of trips and local penalty costs for violations of one or more local constraints;

for one or more selected trips from the set of trips, assigning, using at least the computer processor, different carriers to a selected trip to repair one or more of the local and global constraint violations associated with the selected trip in order to reduce the global cost for the set of trips; and outputting optimized carrier assignments for the set of trips having a reduced global cost based on the changed carrier selections.

7. The computer implemented method of claim 6, where the assigning different carriers includes:

changing the carrier selected for a trip to repair a violation in a trip constraint;

re-calculating the trip cost including penalty costs for violations of one or more trip constraints; and determining an effect of the carrier change on the global cost of the set of trips including global penalty costs for violations of the one or more global constraints.

8. The computer implemented method of claim 6, where the assigning different carriers includes determining the global cost for each change in carrier assignment to a trip.

9. The computer implemented method of claim 6, where the assigning different carriers includes selecting carriers from a list of available carriers.

10. The computer implemented method of claim 6 further including assigning a penalty cost to a selected constraint from the trip constraints or the global constraints for violating the selected constraint.

11. A system, comprising:

means for selecting a primary carrier for each trip in a set of trips, where a trip defines a route for transporting a load from a source to a destination and includes an assigned carrier, a trip cost, and one or more local trip constraints the primary carrier being selected for each trip based on a lowest cost for the trip based on the one or more local trip constraints;

means for analyzing the set of trips, where the set of trips includes one or more global constraints and a global cost, where the global cost includes a sum of single trip costs, global penalty costs for violations of one or more global constraints and local penalty costs for violations of one or more local constraints;

means for selecting different carriers for selected trips in order to cure the one or more local constraint violations and one or more global constraint violations;

means for rating each selected different carrier and its effect on a global cost of the set of trips to determine which selected carriers for selected trips reduce the global cost; and means for generating optimized carrier selections for the set of trips to obtain a reduced global cost.

12. A non-transitory computer-readable medium that provides processor executable instructions for causing a computer to perform a method of transportation planning, the method comprising:

selecting a primary carrier for each trip in a set of trips, where a trip defines a route for transporting a load from a source to a destination and includes an assigned carrier, a trip cost, and one or more local trip constraints, the primary carrier being selected for each trip based on a lowest cost for the trip based on the one or more local trip constraints;

where the set of trips has an associated global cost, and the set of trips are to comply with one or more global constraints, where the associated global cost being based at least in part on at least a sum of single trip costs, global penalty costs for violations of one or more global constraints and local penalty costs for violations of the one or more local trip constraints;

identifying a violation of one or more of the global constraints and one or more of the local trip constraints to be repaired;

reassigning the carrier selected for one or more trips from the set of trips and determining if the reassigning repairs the one or more global constraint violations and the one or more local trip constraint violations; and repeating the method until the one or more global constraint violations and the one or more local trip constraint violations are repaired and the associated global cost is reduced.

13. The computer-readable medium of claim 12 where the reassigning selects candidate carriers from a list of available carriers.

* * * * *

UNITED STATES PATENT AND TRADEMARK OFFICE
CERTIFICATE OF CORRECTION

| | |
|---|---|
| PATENT NO. | : 7,765,120 B2 |
| APPLICATION NO. | : 11/113906 |
| DATED | : July 27, 2010 |
| INVENTOR(S) | : Vinay M. Yadappanavar et al. |

It is certified that error appears in the above-identified patent and that said Letters Patent is hereby corrected as shown below:

In column 6, line 38, delete "T1-T20" and insert -- T11-T20 --, therefor.

In column 15, line 36, in claim 1, before "changing" delete "change".

Signed and Sealed this
Seventeenth Day of May, 2011

David J. Kappos
*Director of the United States Patent and Trademark Office*